(12) United States Patent
James

(10) Patent No.: US 6,460,810 B2
(45) Date of Patent: Oct. 8, 2002

(54) SEMIAUTONOMOUS FLIGHT DIRECTOR

(76) Inventor: Terry Jack James, P.O. Box 872, Metter, GA (US) 30439

( * ) Notice: Subject to any disclaimer, the term of this patent is extended or adjusted under 35 U.S.C. 154(b) by 0 days.

(21) Appl. No.: 09/878,903

(22) Filed: Jan. 22, 2001

Prior Publication Data
US 2002/0030142 A1 Mar. 14, 2002

Related U.S. Application Data

(63) Continuation-in-part of application No. 08/709,488, filed on Sep. 6, 1996, now Pat. No. 5,890,441.

(51) Int. Cl.⁷ .................................................. G05D 1/00
(52) U.S. Cl. ........................ 244/194; 244/190; 244/197; 244/195; 244/196; 244/183; 244/189
(58) Field of Search ................................ 244/194, 190, 244/197, 183, 189

(56) References Cited

U.S. PATENT DOCUMENTS

| | | | | |
|---|---|---|---|---|
| 3,386,689 A | * | 6/1968 | Parker et al. ................ | 244/189 |
| 3,467,344 A | * | 9/1969 | Kramer et al. ................ | 244/184 |
| 4,642,774 A | * | 2/1987 | Centala et al. ................ | 364/434 |
| 4,964,598 A | * | 10/1990 | Berejik et al. ................ | 244/190 |
| 5,067,674 A | * | 11/1991 | Heyche et al. ................ | 244/190 |
| 5,255,880 A | * | 10/1993 | Lyloc et al. ................ | 244/197 |
| 5,493,497 A | * | 2/1996 | Buus ............................ | 364/434 |
| 5,695,157 A | * | 12/1997 | Coirier et al. ................ | 244/183 |

* cited by examiner

Primary Examiner—Michael J. Carone
Assistant Examiner—Stephen A Holzen

(57) ABSTRACT

A device for programming industry standard autopilots by unskilled pilots. The effect of the invention is such that when the invention is employed in a flying body comprising an industry standard autopilot with a digital flight control system, the invention provides for the safe operation of any aircraft by an unskilled pilot. The device additionally affords skilled pilots a more rapid and simplified means of programming autopilots while in flight thus reducing a skilled pilot's cockpit workload for all aircraft flight and directional steering, way points, and aircraft flight functions reducing the possibility of pilot error so as to effect safer flight operations of an aircraft by affording a skilled pilot to direct aircraft steering and function while under continuous autopilot control.

1 Claim, 3 Drawing Sheets

US 6,460,810 B2

SEMIAUTONOMOUS FLIGHT DIRECTOR

This is a continuation in part of U.S. patent application Ser. No. 08/709,488, filed Sep. 6, 1996, and which has been issued as U.S. Pat. No. 5,890,441 on Apr. 6, 1999.

BACKGROUND AND DESCRIPTION OF THE PRIOR ART

With regard to the prior art apparatuses in contrast to the Semiautonomous Flight Director (SFD) device disclosed herein which supplants pilot's skill in flying an aircraft employing an autopilot; all of the prior art apparatuses require a skilled pilot's knowledge and abilities for safe and/or effective operation of an aircraft employing an autopilot whether manned or unmanned. To one degree or another each prior art apparatus either augments, on a limited basis or assists on a limited basis, a skilled pilot's direct operation of an aircraft's flight controls or they afford a skilled pilot a means by which to better utilize an autopilot while in flight. However, none of the prior art apparatuses supplant's the pilot's skill in flying an aircraft whether manned or unmanned.

The primary departure, of the SFD, from the prior art is that the prior art requires that the pilot temporarily over ride or disconnect from the autopilot and take "direct" control of an aircraft's flight controls to make changes in the aircraft's flight direction. The fields of aerospace and aviation teaches that such changes in an aircraft's flight controls can only be made safely by a skilled pilot, skilled in flying the particular aircraft flown.

All of the prior art allows for direct control of an aircraft's flight controls by a pilot whether or not the pilot employs an installed autopilot or not. The SFD on the other hand does not allow direct control of an aircraft's flight controls in order to effect safe flight when the SFD is employed with an autopilot.

The SFD's secondary departure from the prior art is that the prior art requires that the pilot temporarily disengage or over ride the autopilot to make changes in the aircraft's flight controls in order to subsequently program or reprogram the autopilot whereas the SFD allows for continuous autopilot control of the aircraft while coincidentally allowing the pilot to make changes in direction or flight function.

The third and paramount departure from all the prior art devices is the manner by which the prior art effects the programming or reprogramming of an autopilot while in flight which requires the pilot to have the necessary skills in flying the particular aircraft flown in order to safely effect such programming or reprogramming of an autopilot whereas the SFD does not require such skills in order to safely program or reprogram an autopilot while in flight.

With regard to the prior art it is during the periods of time where the pilot overrides, disengages, or otherwise suspends the autopilot's control over the aircraft that precludes the safe operation of an aircraft by an unskilled pilot or operator.

The prior art always employs a plurality of means to control an aircraft either by the direct control of the aircraft by a skilled pilot or the aircraft is controlled autonomously by the autopilot. The term "Semiautonomous" as applied in this application means that the aircraft is controlled singularly, at all times, by the autopilot; autonomously, but, re-programmable without temporarily suspending the autopilot's control of the aircraft to make flight changes.

Flight control, situational awareness and the lack thereof for Unmanned Aerial Vehicle (UAV) pilots is of particular concern to UAV manufacturers and users alike. Most specifically military and non-military government users. As of the date of this application, over eighty-five percent of all UAVs currently being flown in the world today will crash as a result of a UAV pilot's lack of situational awareness and the resulting loss of flight control over the UAV flown regardless of any given UAV pilot's skill and/or experience level. These factors, according to current UAV mishap statistics, are of paramount importance to the Federal Aviation Agency (FAA) and the National Transportation and Safety Board with respect to their authorization for use and implementation of UAV technology in the civilian and commercial aviation sectors.

The SFD was specifically devised to address these issues of pilot situational awareness in UAV's and more specifically the horizontal or vertical take off or landing (HOVTOL) UAV of U.S. Pat. No. 5,890,441 issued Apr. 6, 1999 to the applicant Terry J. James and Johnny Swinson (deceased; Suanne Walker, executrix). It is consequential that the SFD provides a means by which manned aircraft may be piloted by unskilled pilots or utilized by skilled pilots of manned aircraft to reduce cockpit workload as well as other UAV platforms.

Disclosed in U.S. Pat. No. 5,255,880 issued on Oct. 26, 1993, to Woon Lyloc and David C. Pattison, is a manual override apparatus which allows only a skilled pilot to safely override autopilot operation in aircraft that have fly by wire or fly by light flight control systems as opposed to mechanical flight control systems having an autopilot system.

In the prior art device of U.S. Pat. No. 5,255,880 a pilot does not have to disengage the autopilot in order for a skilled pilot to make direct changes to the flight controls of an aircraft employing the device. The degree and amount of linear change made by the action of a pilot displacing a given aircraft's manual control stick or yoke is sensed by a circuit when the pilot places a specific amount of force on the control stick or yoke. Once the amount of force level in the pilot's yoke or control stick reaches a certain threshold, the magnitude and degree of control stick deviation, and movement, in linear terms, of the pilots' control stick or yoke movement effects a proportionate degree of change in the aircraft's flight controls to the exact degree of deviation made in the pilot's control stick or yoke as in normal flight.

It is important to note here, that in the application of U.S. Pat. No. 5,255,880, only a skilled pilot having the knowledge and sufficient specific skills in flying a particular aircraft under non-autopilot operation could safely make such linear deviations in the control stick or yoke of such an aircraft in order to avert directing the autopilot to initiate a negative or dangerous flight maneuver. The autopilot employing this device would only effect the changes initiated by the pilot to include negative and acrobatic maneuvers. The reason for this is that the amount of deviation made in the pilot's control stick is directly related and linearly proportionate to the amount and degree of linear and proportional change effected in the flight controls of the particular aircraft flown by the pilot. If the pilot was unskilled in flying the aircraft a crash could occur as a result of placing too much or too little displacement in the control stick or yoke.

This is to say that, in the application of the prior art of U.S. Pat. No. 5,255,880, if an unskilled pilot were to place the control stick into a position and to such a degree that it would cause a negative or dangerous flight maneuver the flight controls of the aircraft flown under autopilot command employing the prior art would likewise place said aircraft in a negative or dangerous flight regime. This could result in the loss of aerodynamic control of the aircraft if it were not for the prior art's requirement for a trained pilot's skill being necessary in precluding the placing of the control stick in such a position as to cause a dangerous or negative flight regime. The prior art of U.S. Pat. No. 5,255,880, therefore, requires a skilled pilot in order to safely utilize the invention.

The advantage of U.S. Pat. No. 5,255,880 is it allows override control of the autopilot's flight controls of an aircraft having a fly by wire or fly by light flight control system without disengaging the autopilot whereby a skilled pilot may make changes directly to the flight controls even when the autopilot is active.

A disadvantage of this prior art device is that it is not applicable to aircraft having flight control systems other than fly by light or fly by wire flight control systems and the system requires operation only by a skilled pilot while overriding an active autopilot.

U.S. Pat. No. 5,067,674 issued Nov. 26, 1991 to Albert Heyche, Alain Latteur, and Philippe Dekoninck, all of Brussels Belgium, discloses a control system for remote controlled aircraft. The device is, in effect, a compensator for variations of time lags associated with the difference in time from the moment a pilot initiates an action by remote control until the aircraft, in flight, actually begins to act on the change with respect to the aircraft's resultant attitude change that follows the execution of the various interactions of the aircraft's flight control surfaces.

It is further disclosed in U.S. Pat. No. 5,067,674 that the device automatically compensates for variations in normal operation of a flight control system of a remotely controlled helicopter to prevent a certain limited number of negative flight regimes.

The prior art device of U.S. Pat. No. 5,067,674 "aids", in an automatic manner, a skilled RC pilot in piloting a remotely controlled helicopter. The system does not however, supplant the skill normally required to pilot a remotely controlled aircraft or helicopter.

U.S. Pat. No. 4,964,598 issued Oct. 23, 1990 to Zacharaia Berejik, Ramot Tzahala; Allon Wallach, Moshav Talmei Elazar, of Israel discloses an apparatus to automatically stabilize, to a certain degree, a remotely controlled aircraft in yaw and roll for aircraft turns initiated by a pilot when the aircraft is required to bank in order to accomplish a turn. The apparatus also provides automatic stabilization compensation of the pitch of a remotely controlled aircraft for aircraft ascensions and descentions initiated by the pilot.

The apparatus of U.S. Pat. No. 4,964,598 however, does not supplant pilot skill but, rather, is an aid to a skilled pilot by automatically compensating, to a certain degree, for a pilot's lack of situational awareness of the difference between what a pilot perceives to be the actual attitude of a remotely controlled aircraft versus the actual physical attitude of the remotely controlled aircraft when performing flight maneuvers. The apparatus also holds the flight controls in the last commanded flight command in the event of interferences with the aircraft's radio link in RC applications. The apparatus can not preclude a pilot's placing the aircraft in a negative flight regime however.

The apparatus of U.S. Pat. No. 4,964,598 allows a skilled pilot to perform flight maneuvers, including negative flight regimes, in order to accomplish flight maneuvers in such a way as to compensate, to a limited degree, for the lack of the pilot's situational awareness of the actual physical attitude of the remotely controlled aircraft with respect to the pilot's perception of the aircraft's attitude. The device is essentially stabilizes the flight control surfaces of an aircraft or helicopter. It does not however compensate for pilot skill in flying an aircraft or helicopter.

U.S. Pat. No. 4,642,774 issued Feb. 10, 1987 to John P. Centala and Kenneth W. McElreath of Iowa is similar in function to the apparatus earlier mentioned herein and which is disclosed in U.S. Pat. No. 5,255,880. Both inventions require a skilled pilot in order to effect the product of the inventions.

The apparatus of U.S. Pat. No. 4,642,774 allows only for a skilled pilot to safely make manual flight control deviations under autopilot control and then subsequently return to the autopilot's preprogrammed flight regime, or optionally, to a new program set. The new program set however, is determined by the amount and degree of liner displacement made by the skilled pilot's manual flight control deviations of the control stick or yolk.

The Centala device, when activated to disconnect from the autopilot, allows the pilot to fly the aircraft directly, as normal, as if the autopilot was not on in order to effect a new flight regime which could include a negative or dangerous flight regime if it were not for the pilot's skill and knowledge.

The Centala device requires that only a skilled pilot could safely make the changes to the aircraft's flight controls employing the device to effect safe flight changes in the autopilot's flight regime. Any change in the controls made by the pilot will be effected by the autopilot whether such changes are acrobatic in nature, and /or safe or not.

The primary effect of the Centala prior art device is to allow for override changes in an autopilot's control of an aircraft only by a skilled pilot's degree of linear displacement of the pilot's aircraft control stick by optionally either allowing the autopilot to return to its preprogrammed flight path or to an altered programmed flight path in accordance with the degree of linear displacement of the pilot's aircraft control stick which could only be effected, safely, by a skilled pilot. The Centala device relinquishes direct control of the aircraft to the Pilot in order to effect autopilot changes.

All the actions of the Centala device are, therefore, accomplished by a skilled pilot in such a way as to make direct flight control changes to the aircraft's flight path without abrupt flight dynamics resulting from the direct flight control change that was initiated by the skilled pilot in the autopilots returning to the original flight path or the new flight path.

Special emphasis is placed here in this application that both of the aforementioned prior art devices of U.S. Pat. Nos. 4,642,774 and 5,255,880 require that "only" a skilled pilot, versed in the manual flight operations of the particular aircraft flown and so equipped with said devices, should make changes in the positioning or repositioning of the pilot's control stick or yolk in order to preclude the manual placement of the pilot's control stick or yolk by an unskilled pilot in such a position and to such a degree as to cause a negative flight maneuver being initiated by the autopilot as a direct result of the unskilled pilot's actions.

Described in U.S. Pat. No. 5,695,157 issued Dec. 9, 1997 to Coirier et al., is a device that assists in the piloting of an aircraft or helicopter by a skilled pilot only during a landing in bad weather and only works in conjunction with a ground based radio-electric ILS (glide slope) system. The device provides an audible alarm to the skilled pilot so that the skilled pilot can directly adjust the flight controls of the aircraft to assure a safer landing and advise the skilled pilot to "go around" in order to avoid overshooting the runway's safe touchdown zone. The device cannot be employed by a unskilled pilot safely but rather, is a device that aids a skilled pilot in landing an aircraft or helicopter in inclement weather.

U.S. Pat. No. 3,467,344 issued Sep. 16, 1969 to K. C. Kramer is a device for automatically offsetting the effects of wind shear on an aircraft during the landing of the aircraft when employed with automatic landing system utilizing ground based ILS (glide slope) telemetry. The device aids a pilot in limiting the very sudden effects of wind shear on an aircraft's roll, pitch or yaw while landing by sensing when the aircraft has exceeded a safe roll, pitch or yaw limit as a result of a sudden wind shear. The effect of the invention is such that when a sudden wind shear negatively affects the aircraft while close to the ground during landings an automatic and near instantaneous adjustment by the device of the aircraft's flight controls are effected to offset the affects of wind shear on the aircraft at a much greater response time than a skilled pilot could respond to. The device is only applicable to landing an aircraft and works in conjunction with ground based radio-electric ILS (glide slope) systems. The device cannot be employed to totally fly an aircraft by an unskilled pilot, but rather, can only be employed by a skilled pilot in assisting the skilled pilot in landing an aircraft in the event of wind shear during a land based ILS glide slope assisted landing.

Describe in U.S. Pat. No. 3,386,689 issued Jun. 4, 1968 to Robert H. Parker et al. is a device for overriding autopilot control of large transport aircraft subsequently allowing a skilled pilot to maneuver the aircraft in the traditional manner of prior art of flying aircraft without autopilots in accordance to the magnitude and linear displacement of the pilot's control stick or yoke to effect flight changes in the aircraft and subsequently allowing the autopilot to assume the new heading upon the pilot releasing the aircraft's control stick or yoke to a detent position. The invention allows only a skilled pilot to safely effect autopilot heading changes by means of manual changes in the aircraft's conventional flight controls. The device does not allow for the autopilot heading changes to be effected safely by an unskilled pilot.

In U.S. Pat. No. 5,493,497 issued Feb. 20, 1996 to Henning Buus is a triple redundant fly by wire flight control system extremely similar to the quad redundant fly by wire flight control system described in Military Standard 1553, (MIL-STD-1553), developed in the 1970's and employed in modern aircraft such as the Lockheed Martin F-16 Fighter, and the Northrop Grumman B-2 Bomber. The invention is a flight control system however, and is not an autopilot but does employ an air data computer and additional features of such prior art.

As the system is fly by wire, one of the features of U.S. Pat. No. 5,493,497 is similar to MIL-STD-1553 in that the system affords the pilot a "feel" for flying an aircraft both physically and visually whether a skilled pilot is flying the aircraft or it is being flown autonomously by the flight computer in autopilot mode. Another feature of the system is that it allows for controlled flight of aerodynamically unstable aircraft, designs such as the F-16 Fighter and the B-2 bomber. Also, like the prior art the system allows the pilot to override autonomous mode to effect flight control changes.

Being that U.S. Pat. No. 5,493,497 is a fly by wire system and thus "electronic", and in order to provide a "feel" for flying, the system, also like the prior art, makes changes to an aircraft's flight control surfaces that are "directly proportionate" to the displacement of the pilot's control stick and rudder pedals which requires pilot skill to preclude negative flight maneuvers. As the pilot's controls effect proportionate linear changes in terms of magnitude in the flight controls the magnitude component of the pilots control over the aircraft flown by the system would, therefore, preclude safe operation of an aircraft employing the system by an unskilled pilot.

SUMMARY OF THE INVENTION

The invention relates to the fields of aircraft in general, and to integrated flight control systems employing autopilots specifically, when employed in combinations thereof and embodied therein in an airplane, helicopter, or unmanned aircraft having flight control systems employing congruent combinations of industry standard gyroscopic, electronic, mechanical, electro-mechanical and aerodynamic means of maintaining airborne platform stability during flight; and, whereupon such congruent systems combine to provide for safe aerodynamic control and steering of an aircraft in 3 axis by a skilled pilot.

It is the object of the invention to improve overall flight safety by providing a means capable of significantly reducing a skilled pilot's work load and/or eliminating or supplanting the piloting skills normally required to fly any manned or unmanned helicopter or aircraft equipped with an autopilot employing a digital flight control system.

The invention has specific commercial and military applications in the unmanned aerial vehicle (UAV) market as well as the manned aircraft market. As of the date of this application, Federal Aviation Administration (FAA) policy regarding commercial use of UAVs is very restricted. These restrictions are predicated on concerns of safety regarding the design of such UAVs and their use by the general public.

With respect to safe operation of a UAV in a commercial application the FAA requires that certain safe operational attributes of a UAV design be demonstrated before authorization for it's use in a commercial/civil application is granted. Four of these FAA concerns are as follows:
(1)—Pilot situational awareness
(2)—Controllability and stability of the platform
(3)—Interruption of the control data link (lost link)
(4)—Ease and safety of operation
The invention disclosed in this application addresses the aforementioned four FAA safety concerns inclusively.

In the case of unmanned aircraft applications the SFD, depicted by the block diagram of FIG. 2, may be employed in any UAV application equipped with an autopilot having a digital flight control system. The SFD can afford any UAV aircraft so equipped to address the aforesaid FAA safety requirements.

In the case of manned aircraft applications the SFD can significantly reduce a skilled pilots' workload in piloting operations where the aircraft piloted is likewise so equipped with an autopilot having a digital flight control system.

Aviation and aerospace history teaches that it is well know in the art that aircraft, and helicopters whether manned or unmanned can only be safely controlled and operated in one of two ways. One way as history and the prior art points out is that for any given aircraft or helicopter to be flown safely without assistance of the prior art is that it must be flown "hands on" the pilot's flight controls by a trained pilot skilled in flying the particular aircraft flown by the pilot. Given the state of the art of the prior art a second way to safely fly an aircraft is autonomously by means of an autopilot. However, this latter means still requires a skilled pilot in order to make changes in the autopilot's way point repertoire in order for the autopilot to be an effective piloting tool in flight. It, therefore, stands to reason as the prior art teaches that it is not obvious to those skilled in the art that a pilot's "skill" can be eliminated in the application of the prior art.

The SFD device is devised to address the complexities of flying the HOVTOL UAV of U.S. Pat. No. 5,890,441 and also to address FAA concerns for allowing UAV technology to be employed by the general public. Additionally, the SFD device needed to address the type of end user of the HOVTOL invention in user applications by such personnel as firemen, police officers, farmers, merchant seamen and the like. In order for the HOVTOL to be commercially viable in light of the crash rate of UAV's employing prior art techniques i.e. direct RC control or autonomous operation by "skilled" RC pilots and in knowing the personnel who will operate the HOVTOL UAV will most likely not be pilots a novel solution was needed hence the SFD device.

To effect what was needed in order to safely fly the HOVTOL UAV of U.S. Pat. No. 5,890,441 by commercial users who would typically not have RC piloting skills a requirement is thus established that the HOVTOL invention would have to be flown autonomously by an autopilot at all times. Secondly, changes in the HOVTOL's autopilot program am for heading, speed, altitude, and function (i.e. mode of landing, taking off, hovering etc.) would have to be effected by personnel not skilled in flying RC aircraft. Therefore, such changes should be effected by the SFD device of FIG. 1 and as employed in FIG. 2 which is a simplified representation of the flight control system of the HOVTOL UAV of FIG. 3 cited in U.S. Pat. No. 5,890,441.

In general the unskilled HOVTOL pilot would make changes to the HOVTOL's direction, speed, altitude and mode or function by simple, discreet, non-linear and non-proportional manipulations of the joy stick FIG. 2, 78 and one or more of a bank of 7 function switches FIG. 2, 77 installed in the SFD 58 of FIGS. 1 and 2. The SFD circuit FIG. 2 thus interpreting the pilot's desired heading, speed, altitude and function thus changes the program set of the HOVTOL's autopilot's digital flight control software (ADFCS) of FIGS. 1 and 2 of the HOVTOL's autopilot FIGS. 1 and 2 54 on board the aircraft of FIG. 3 by means of an electrical interface FIG. 1 83 from the SFD 58 to the pilot's ground control station (GCS) shown in FIG. 1, 57 and subsequently relayed by a radio telemetry means FIG. 1 82 via the GCS's and the UAV's telemetry transceivers FIG. 1 55. The HOVTOL UAV's autopilot 54 would thus articulate congruently; according to the HOVTOL's flight laws stored in the HOVTOL's autopilot 54; the appropriate air control surface servos FIG. 1 60 which thus articulate the various air control surfaces of FIG. 1: 2, 3, 4, 10, 11, 12, 13, and 17; and the HOVTOL's horizontal propulsion propellers FIG. 1: 14, and 15; and the HOVTOL's vertical lifting fans, and engine(s) (not shown) to effect safe flight maneuvers.

BRIEF DESCRIPTION OF THE DRAWINGS

For the purposes of explaining a typical complex application of the invention.

PREFERRED DETAIL DESCRIPTION OF THE EMBODIMENTS OF THE INVENTION

Figure 1:
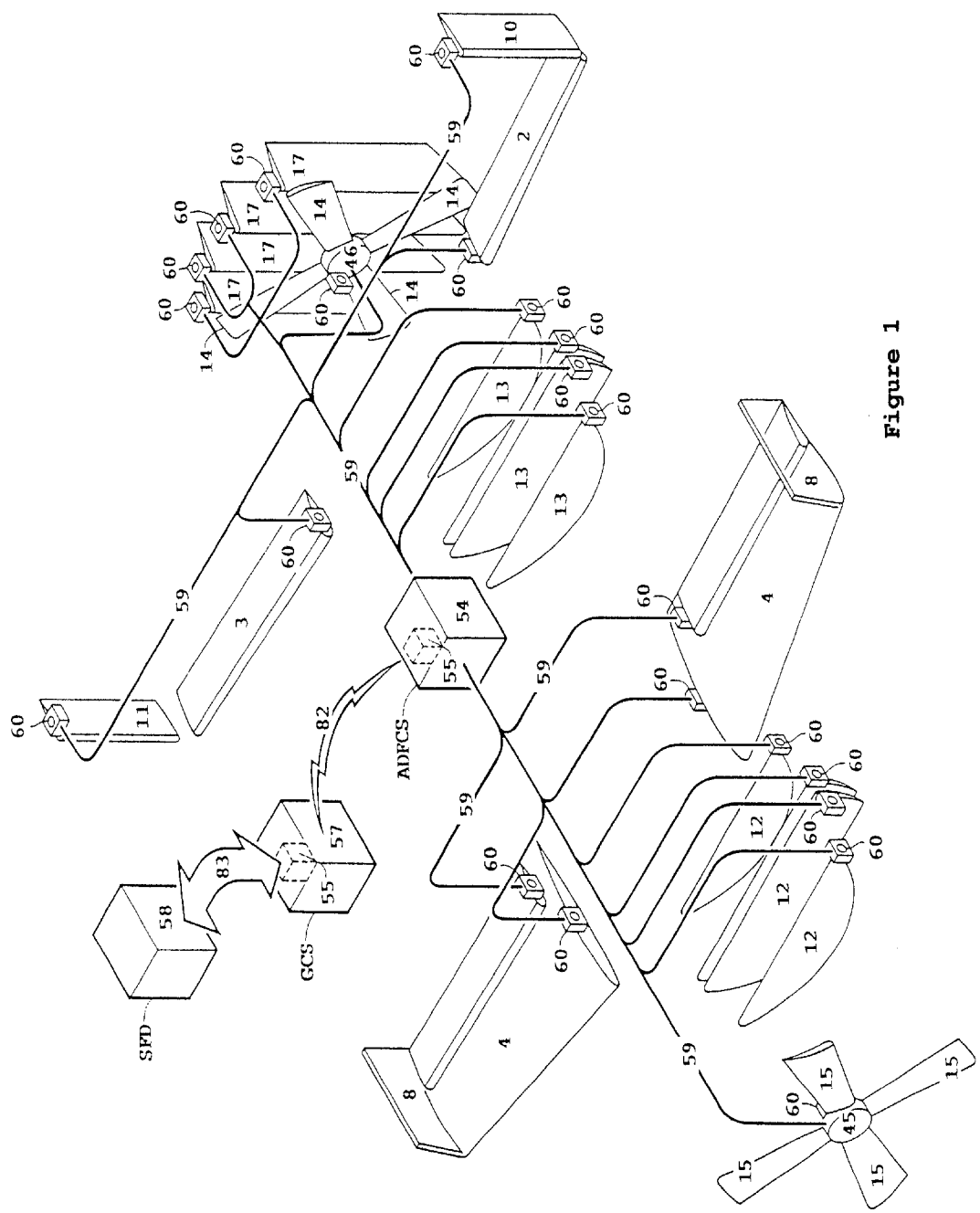
FIG. 1 depicts a simplified schemata of the flight control system of the HOVTOL unmanned aerial vehicle cited in U.S. Pat. 5,890,441 issued April 1999.
Figure 2:
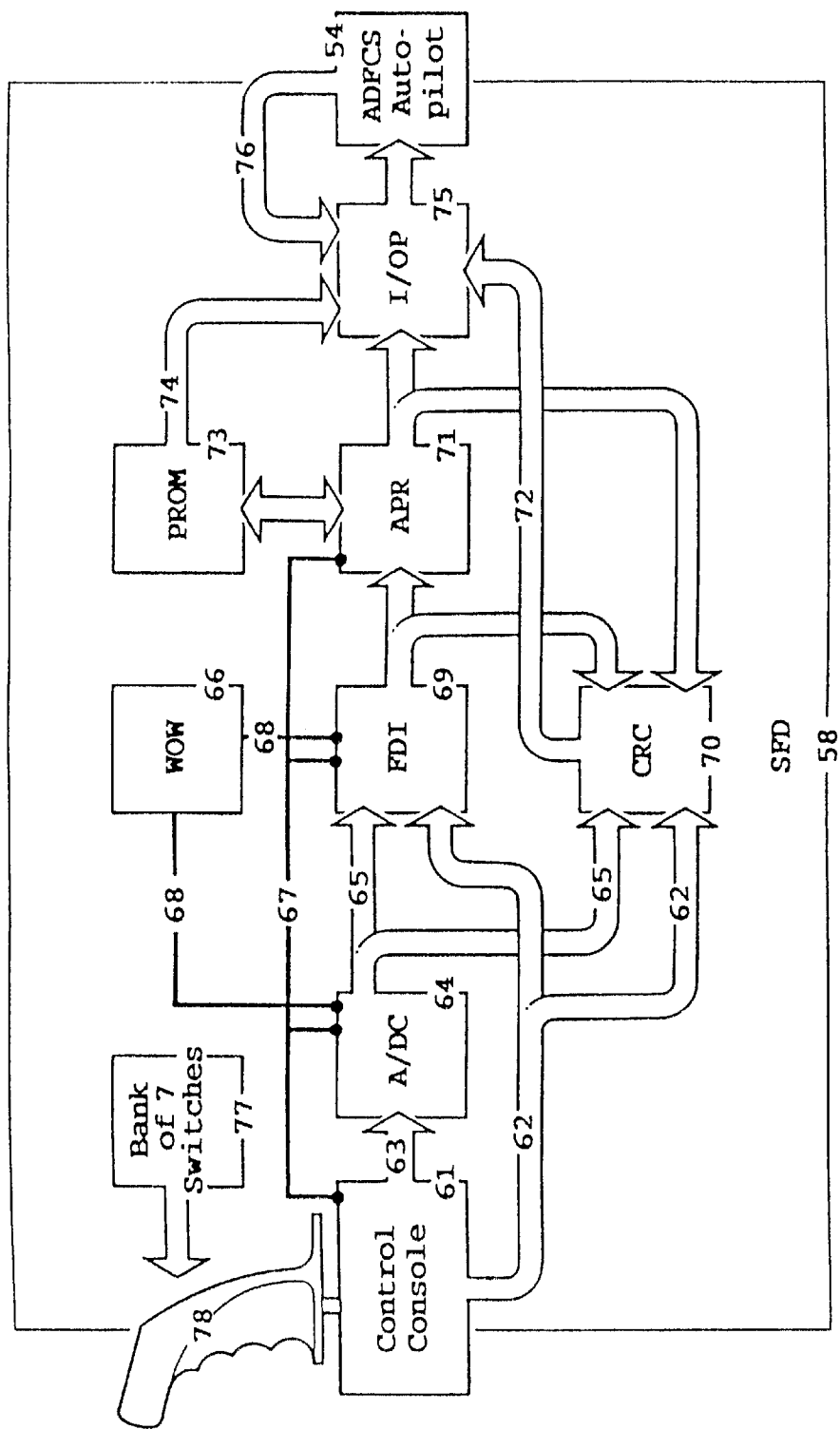
FIG. 2 depicts a simplified functional block diagram of the invention as employed in U.S. Pat. 5,890,441 and is representative of the inventions construction.
Figure 3:
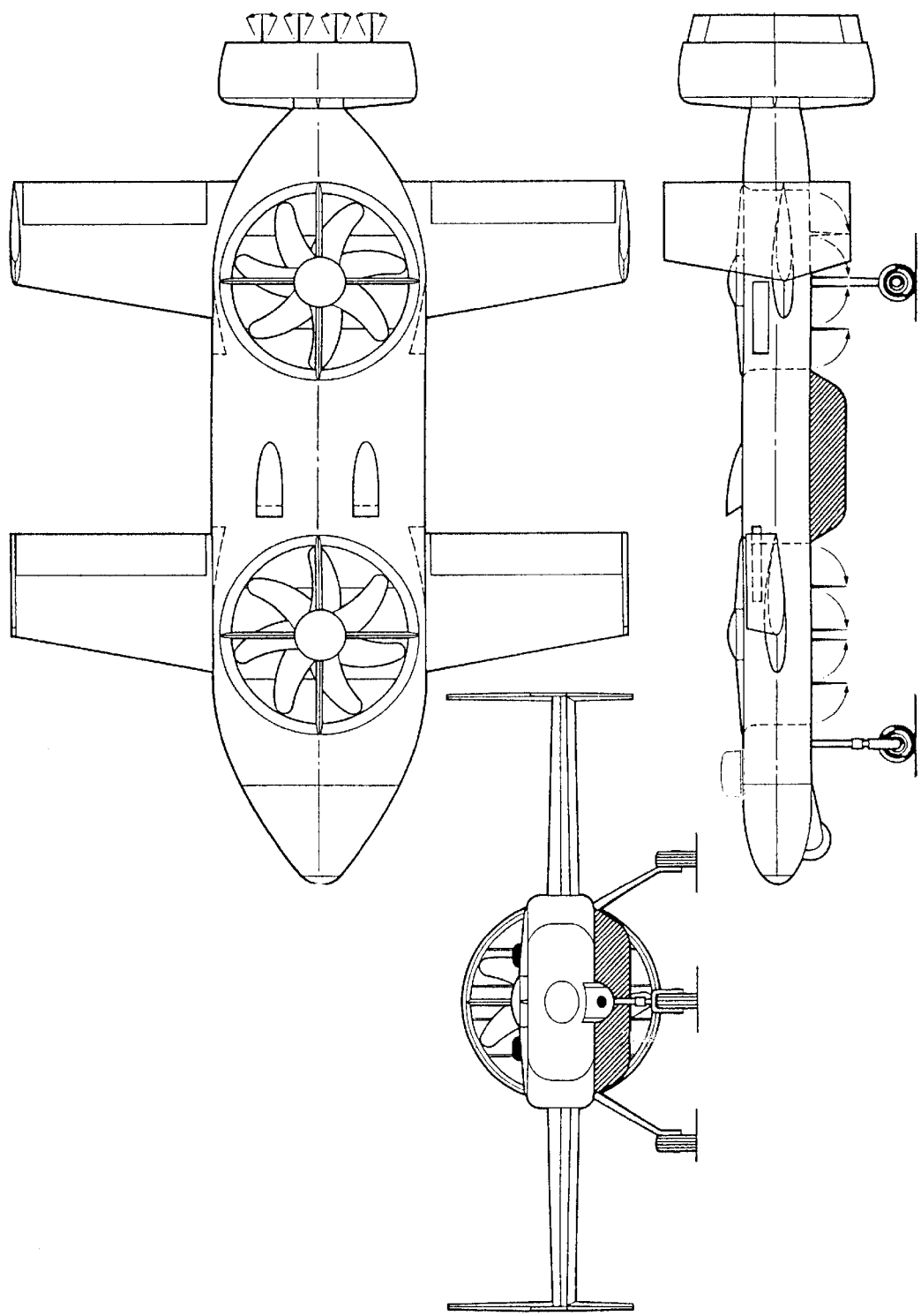
FIG. 3 is for reference purposes of the HOVTOL UAV invention of U.S. Pat. No. 5,890,441 and for which the SFD invention was devised and considered the best mode for carry out the invention.

Refer now to FIG. 1 and FIG. 2 which shows the HOVTOL UAV of FIG. 3 flight control system in FIG. 1 and the SFD in FIG. 2 of U.S. Pat. 5,890,441 and is representative of the best mode of carrying out the invention. It is not the intent of this specification to limit the public domain in the many potential designs, methods and techniques that can be developed in carrying out the utility of the invention disclosed herein but, rather, to delineate the basic principals that define the invention's application in programming an industry standard autopilot in such a way as to supplant skilled pilot operation of an unmanned aircraft employing an autopilot. Therefore, this specification shall teach by the example of the best mode of carrying out the invention how the invention disclosed herein can be constructed and applied toward a complex transportation apparatus.

Referring now to FIG. 3, the invention is employed in a UAV having wings and aerodynamic flight controls i.e. canards, canard tip fences, air control surfaces of the wings, two vertical stabilizers, air control surfaces of the vertical stabilizers, horizontal thrust vectoring vanes, vertical thrust vectoring vanes located beneath two vertical lifts situated in the UAV's fuselage in the exhaust slip stream thereof, variable pitch tractor propeller (not shown), and a rear pusher shrouded pusher propeller. Referring now to FIG. 1 the pitch of propellers 14 and 15 being articulated by swash plate apparatuses 45 and 46 and all of the aforesaid flight controls of FIG. 1 and FIG. 3 being controlled by electro-mechanical means of FIG. 1 59 and 60, in conjunction with said vertical thrust vectoring vanes 12 and 13.

The embodiment of the semiautonomous flight director (SFD) invention of FIG. 1 and FIG. 2, as applied in the HOVTOL UAV invention of U.S. Pat. No. 5,890,441 FIG. 3 is to provide flight way point, flight function/mode and flight directional and ground steering programing of an industry typical autopilot FIG. 1 (54) and FIG. 2 (54) when such autopilot (54) employs Aircraft Directional and Function Control Software FIG. 1 (ADFCS) containing the HOVTOL UAV's flight control laws, by means of a industry typical electrical interface FIG. 1 (83) to the pilot's Ground Control Station (GCS) FIG. 1 (57) and thus by means of industry typical radio frequency data link transceivers FIG. 1 (55) installed in the pilot's (GCS) FIG. 1 (57) and onboard the UAV FIGS. 1 and 3 by means a radio frequency data link FIG. 1 (82) to allow for autopilot control change programing of an unmanned aircraft throughout all of an unmanned aircraft's flight and ground operations therefore providing a means by which an unskilled pilot may safely direct the operation of an unmanned aircraft.

Referring now to FIG. 2, "flight direction"; by an "unskilled" pilot, as opposed to "direct flight control" by a "skilled" pilot of an aircraft is effected by the pilot's articulation of the pilot's joy stick FIG. 2 (78) and one or more of the bank of 7 flight function/mode switches FIG. 2 (77) which are hence interpreted by the SFD device FIG. 1 (58) and FIG. 2 (58) by means of sensing electronic analog signals FIG. 2 (63) from the pilot's joy stick's FIG. 2 (78) transducer or bridge circuit (not shown) coincident to the actuation and/or non actuation of one or more of the seven flight function/mode switches FIG. 2 (77) which subsequently produce discrete digital signals and/or levels FIG. 2 (62) and (65). Signals FIG. 2 (62) being produced by the bank of seven function/mode switches FIG. 1 (77) ergonomically located in the pilot's control console FIG. 2 (61) and joy stick FIG. 2 (78). Analog signals FIG. 2 (63) are produced by the pilot's joy stick transducer or optionally an electronic bridge circuit (not shown) and input to an Analog to Digital Converter circuit (A/DC) FIG. 2 (64) which produces resultant digital logic level signals FIG. 2 (65) coincident to the quadrant position of the pilot's joy stick. The logic signals FIG. 2 (65) produced by the A/DC circuit FIG. 2 (64) being representative of the pilot's desired direction in accordance to the quadrant position of the pilot's joy stick FIG. 2 (78) are together with the logic signals of FIG. 2 (62) being representative of the pilots desired flight function or mode, and thus input as a multi-bit digital logic word to the Flight/Function Direction Interpreter (FDI) circuit FIG. 2 (69). The FDI circuit can be of any electronic design that converts the resultant multi-bit digital logic word developed by the A/DC circuit of FIG. 2 (64) and logic levels of the bank of seven flight function/mode switches FIG. 2 (77) which would result in a memory address pointer which will be used to select a memory address of a software routine which will program the autopilot FIG. 1 (54) and FIG. 2 (54).

It shall be clearer to one skilled in the art as to how the aforementioned effected address pointer produced by the FDI FIG. 2 (69) can be used to program the autopilot FIG. 1 (54) and FIG. 2 (54) as later discussed in this specification.

The aforementioned resultant address pointer produced by the FDI FIG. 2 (69) as a result of the aforementioned multi-bit logical word input via FIG. 2 (65) and FIG. 2 (62) to the FDI FIG. 2 (69) provides flight function and flight direction autopilot programming address pointers to the Autopilot reprogrammer (APR) circuit 71 which may be of any electronic design, software and protocol specified by one skilled in the art to subsequently effect programming the autopilot's FIG. 1 and FIG. 2 (54) flight control registers by which means an unskilled operator may direct and navigate an aircraft under autopilot control.

Referring now to FIG. 2, a semiautonomous flight director device (58), comprised of a spring loaded, automatic return to null position electronic transducer or bridge circuit type joy stick (78) is embodied in a control console (61). The joy stick (78) providing analog signals (63) analogous to the "quadrant" position of the joy stick (78) as a means to indicate the desired direction of the operator as to UP, DOWN, LEFT, RIGHT, FORWARD, or BACK directions.

A bank of seven flight function/mode switches (77) ergonomically located within the control console (61) and/or joy stick 78 hand grip as may be determined by one skilled in the art for a given application. Whereas each function/mode switch (77) when activated providing an electronic logic signal (62) and an associated function interrupt signal (67) generated by the FDI (69) circuit and or optionally the control console circuit which optionally may or may not be employed by one skilled in the art as the selected design case may be for providing a gating means and or for developing a software interrupt structure means for allowing or disallowing such device attributes as logical versus illogical flight function/mode or steering for the following operator desired functions:

Whereas one switch of the seven function switches (77), being a spring loaded, return to null, double pole, double throw type switch to provide for a means to initiate an accelerate or decelerate function logic signal (62) and interrupt signal (67); and whereas a second function switch (77) being a spring loaded, momentary push button, return to null, single pole, single throw type to provide an "auto return to base" command function logic signal (62) and interrupt signal (67); and whereas a third switch 77 being a spring loaded, momentary push button, return to null, single pole, single throw type to provide an "auto land" command function logic signal (62) and interrupt signal (67); and whereas a fourth switch (77) being a spring loaded, momentary push button, return to null, single pole, single throw type switch to provide a "hover" command function logic signal (62) and interrupt signal (67); and whereas a fifth switch (77) being a non return to null, manual, single pole, single throw, safety type, switch to provide a "normal shut down" command function logic signal (62) and interrupt signal (67); and whereas a sixth switch (77) being a non return to null, manual, single poll, single throw, secured safety, type switch to provide an "emergency shutdown/deploy parachute/activate visual, audible and radio frequency beacons" command function logic signal (62) and interrupt signal (67); and whereas a seventh switch (77) being a spring loaded, momentary push button, return to null, single pole, single throw type switch to provide an "auto flight" command function logic signal (62) and interrupt signal (67); and whereas an aircraft "weight on wheels" (WOW) switch 66 being a single pole single throw type switch out side of the SFD (58) and installed on the aircraft itself and situated physically on the aircraft so as to electromechanically sense the aircraft's weight resting on it's wheels to provide a logic signal (68) for indicating to the Analog to Digital Converter circuit (A/DC) (64), and the FDI circuit (69) that the aircraft is either on the ground or airborne.

An electronic analog to digital signal converter circuit (A/DC) (64) converting analog signals (63) to digital signals (65) for converting the analog signals (63) from the joy stick (78) into digital signals (65) for use by the FDI (69) processor circuit which produces resultant flight function and flight direction program address pointers to the APR (71);

A Flight/Function Direction Interpreter FDI (69) circuit to interpret the converted joy stick's analog signals (63) converted to digital signals (65) by the A/DC circuit (64) and WOW switch (66) status signal (68), control console (61) function switches (77) signals (62) and converts these signals into a digital flight function and or flight direction memory address pointer for input to the autopilot programmer processor ( APR) 71;

An Autopilot reprogrammer (APR) processor circuit (71) which may be of any design chosen by one skilled in the art to effect programing of an industry standard autopilot (54). The APR (71) software program means collates and processes the input command codes of(62) and (65) by means of the FDI (69) circuit's output resultant address pointer and initiates preprogramed software routines stored in PROM (73) based upon the inputs from the FDI (69), an interrupt signal (67) and the status of the logic level (68) of the WOW switch (66). The software programs stored in PROM (73) are formatted for programming the autopilot (54) and are user defined by one skilled in the art with respect to the type, make and model of the autopilot employed; the flight functions/modes allowed or disallowed as being safe or unsafe, logical or illogical; flight steering (heading) allowed or disallowed as to being logical or illogical, safe or unsafe with respect to the flight laws of the aircraft and the airspeed and flight mode of the UAV such as stationary hover, versus horizontal flight mode and the like.

The APR (71) thus decodes the FDIs' (69) flight command and function addressing code signals of the pilot's desired direction, speed, or other allowable functions allowed by the SFD's software according to the UAV's control laws stored in PROM (73).

If the flight direction/function address pointer from the FDI (69) matches a PROM (73) address containing a valid autopilot reprogramming software routine then the software routine is executed by the APR (71) in accordance with the pre-approved user defined flight direction/function program routine stored at that PROM memory 73 address. The APR (71) processor thus translates the FDI (69) code as an address pointer which resolves to a valid autopilot programming software routine stored at the resolved address in PROM (73). The software routine at the resolved address in PROM (73) being formatted to program the particular make and model of autopilot employed with respect to the user defined UAV flight laws then the FDI (71) transfers the autopilot flight programming signals to the Input/Output I/OP interface circuit (75) (discussed further on in this specification) which subsequently gates the program data to the autopilot (54) by means of the CRC processor (70) (discussed further on in this specification) for direct programming of the autopilot (54) program command registers accordingly.

If for some reason an invalid pilot command word is input via (65) and (62) to the FDI (69) the resultant output address pointer resolves to an address in the APR's (71) PROM (73) memory which contains no software routine and thus the APR 71 processor circuit will take no action to subsequently change the autopilot's (54) current program setting. The PROM (73) thus having appropriate user defined software that is unique with respect to the flight laws of the particular type of aircraft application and specific brand or manufacturers type of autopilot and digital flight control system employed may also be employed to set and delimit user defined safe operations of the aircraft.

PROM (73) software therefor entails appropriate code and software routines to govern the APR (71) processor's output according to the pilots desired flight direction/function commands specified by the quadrant position of the joy stick (78) and bank of seven function switches (77) with respect to the unique combination of flight laws of the particular aircraft flown, together with the particular make and model of autopilot's programming format and protocol, and any such user defined software and code that would also prohibit the pilot form executing unsafe or illogical flight operations.

A cyclic redundancy check (CRC) (70) processor circuit may be of any design chosen by one skilled in the art however, the CRC (70) software should contain identical flight laws to those also stored in PROM (73). The CRC (70) circuit compares the output signals (62) of the function switches (77) from the control console (61); the output signals 65 of the A/DC (64); and, the output signals of the FDI (69) and the APR (71) for comparison checks of the operators flight direction/function commands matching the address pointer to PROM (73) software as compared to the APR's (71) output. If the operator's command/function is allowable, i.e. the address pointer to the APR (71) matches the address pointer of the CRC (70) and the APR's (71) output matches the command/function inputs (62) and (65) to the CRC (70) as being valid then the CRC (70) allows the execution of a preprogrammed flight maneuver by means of the CRC (70) gating the APRs' (71) outputs for programming flight function and directional commands into the I/OP (75) by way of an authorization gate signal (72) generated by the CRC (70) allowing the output of the APR (71) to be gated into the I/OP (75) and subsequent programming of the autopilot (54).

The CRC processor circuit (75) will disallow the gating of a new redirect/function command from the APR (71) to the I/OP (75) if a match of all the inputs and outputs of the control console (61), joy stick (77), WOW (66), A/DC (64), FDI (69), and APR (71) are not made or are not made within user defined timing limits specified by it's software to prevent responding to momentary inadvertent movements of the joy stick, illogical functions of flight or direction for the particular aircraft flown and current flight mode of the aircraft, and/or any spurious electrical combinations.

An input/output processor (I/OP) circuit (75) which can be any design selected by one skilled in the art which effects the taking of the outputs of the APR processor (71) as authorized by the CRCs' (70) gate signal (72) and converts the APR's (71) output data to a useable protocol and format as determined and conditioned by PROM (73) outputs (74) for transferring the autopilot programming commands according to preprogrammed sequenced formats stored in PROM (73) for a given autopilot (54).

Feed back status input signals (76) to the I/OP (75) from the autopilot (54) are processed by the I/OP (75) to assure that the autopilot (54) has executed the last programming sequence and is ready to receive additional commands. The input feed back status signals (76) verifies that the command given by the operator as translated by the SFD is the command so transferred to the autopilot (54) and that the autopilot (54) has received the command, acknowledged its validity and is proceeding to execute the command.

When the SFD is employed in a UAV application as disclosed herein, referring now to FIG. 1, the SFD (58) is integrated into a ground control station (GCS) (57) which provides the necessary industry standard data link transceivers (55) in providing a duplex radio frequency data link (82) by way of a transceivers (55) on board the UAV for remotely transferring flight direction/function programming of the autopilot (54) and receiving autopilot status feedback to and from the SFD (58) and autopilot (54) on board the aircraft by electrical interface means (83).

Status and feed back signals from the autopilot (54) onboard the aircraft back to the SFD (58) in the GCS (57) is also by way of the duplex radio frequency data link (82) to the radio frequency data link transceiver (55) in the GCS (57) and subsequently back to the SFD (58) by way of an electrical interface means (83).

When the SFD (58) is installed in a manned aircraft application the feed back interface signals are directly (i.e. hard wired) as shown in FIG. (2) (76).

The effect of the SFD on an aircraft when employed with an industry standard autopilot having a digital flight control system and both the SFD and the autopilot's computers have corresponding flight control laws in their respective memories for a given aircraft type is such that when the pilot places the SFD joy stick in a given discrete quadrant position and/or a given discrete flight function switch is activated, the SFD interprets the operators action and subsequently generates flight direction/function programming of the autopilot, allowing therefore, for the safe, continuous, autopilot controlled flight of an aircraft by the autopilot at all times for both in flight and ground operations of an aircraft.

The effect of the SFD therefore, eliminates the requirement for a skilled pilot to otherwise manually reprogram the autopilot and/or linearly displace, by way of traditional aircraft control means of prior art a pilots' control stick, rudder pedals and throttle to the properly coordinated linear degrees of displacement of such controls necessary to effectuate a safe and stable flight maneuver whereas any such flight maneuver could not have been otherwise safely effected were it not for the pilot's skill and ability to fly the given aircraft.

The operation of the SFD is such that all of the aircraft's flight steering and functions are "directed" by either a skilled pilot or an unskilled operator. While the SFD is in operation the operator has no control of the aircraft's flight controls. With the SFD in operation all of the aircraft's flight operations are directly controlled, at all times, by the aircraft's autopilot from start up through out the aircraft's flight including landing and shut down at the end of the aircraft's mission.

The inter-operation of the SFD with the autopilot is such that when the pilot wishes to descend, in horizontal flight mode, the pilot simply places the joy stick of the SFD anywhere between the eleven and one-o-clock quadrant position. Subsequently the SFD will program the autopilot to descend in a preprogrammed sequenced manner so as to descend the aircraft under autopilot control in such a way as to avoid any negative flight maneuvers. The SFD will continue to reprogram the autopilot sequentially to descend the aircraft in a smooth, safe, and controlled manner until such time a desired altitude is attained and the pilot releases the joy stick to return to the spring loaded null position.

Once the joy stick is released and allowed to return to the null position the SFD will program the autopilot to stop descending and maintain the altitude attained while the autopilot simultaneously maintains all other flight functions such as heading and airspeed, mode, etc. congruently.

Likewise when the pilot wishes to ascend the same aforesaid autopilot programming procedure is effected by the SFD when the pilot places the joy stick of the SFD anywhere between the five and seven-o-clock quadrant position.

In like manner for the aforesaid descent and ascent command autopilot programming procedure is effected by the SFD for right turns when the joy stick is placed anywhere between the two thirty and the three thirty-o-clock quadrant position; or for left turns anywhere between the eight thirty and nine thirty-o-clock quadrant position.

To descend and turn right; the joy stick is placed anywhere between the one and two thirty-o-clock quadrant position; to ascend and turn right the joy stick is placed anywhere between the three thirty and five-o-clock quadrant position; to ascend and turn left the joy stick is placed anywhere between the seven and eight thirty-o-clock quadrant position; and to descend and turn left the joy stick is placed anywhere between the nine thirty and eleven-o-clock quadrant position.

When the pilot/operator wishes to perform other flight directions/functions singularly or coincidentally in combinations with other allowable flight directions/functions he may do so save and except for illogical flight directions/functions or combinations for the current flight mode or ground operations mode of the aircraft so disallowed by the SFD's software.

If the pilot wishes to accelerate the aircraft he or she may do so by actuating the spring loaded, auto return to null, accelerate/decelerate switch which is one of the bank of seven switches of FIG. 2 (77), typically in prior art, located in the top of the joy stick to the twelve-o-clock position with his or her thumb. The SFD will subsequently generate a function code for programming of the autopilot to accelerate the aircraft's airspeed. The SFD will continue to program the autopilot to cause the aircraft to accelerate as long as the pilot so depresses the spring loaded, return to null, switch until the accelerate/decelerate switch is released at which point the SFD software would generate a stop acceleration flight function code and subsequently program the autopilot to maintain the speed attained save and except any airspeed limits established by the SFD's preprogrammed software.

Deceleration of the aircraft is accomplished likewise by the pilot placing the accelerate/decelerate switch to the six-o-clock position.

In all flight modes, except stationary hover flight mode, when the pilot releases the accelerate/decelerate switch, the switch will return to the null position and the SFD will sense the pilots action and program the autopilot to stop the acceleration or deceleration of the aircraft, which ever the case may be, and to maintain the airspeed so attained.

The ground operations mode of an aircraft employing an SFD device is such that when the weight on wheels (WOW) switch (66) of FIG. 2, is sensed by the SFD indicating that the aircraft is on the ground then the SFD software will disallow certain illogical flight functions for ground operation of the aircraft such as hover, ascend, and descend etc.

In the case of ground operations such as runway taxiing of an aircraft employing the SFD; directional operations of the aircraft are effected by the SFD when the pilot places the joy stick between the eleven and one-o-clock quadrant position and the aircraft can be steered on the ground in the forward direction. Forward movement of the aircraft occurs when the pilot actuates the acceleration/deceleration switch as aforementioned described to the twelve-o-clock position to reprogram the autopilot for ground operation.

Likewise the aircraft will reverse, (back-up), on the ground when the joy stick is placed anywhere between the five and seven-o-clock quadrant position to reprogram the autopilot for a back up ground operation.

Similar steering commands are generated by the SFD to program the autopilot for steering the aircraft on the ground in the forward left and forward right ground steering etc. as described earlier for ground steering directional commands.

The major difference in the functional interaction between the SFD and the autopilot when the aircraft is on the ground is that the SFD does not program the autopilot to maintain the function required when the joy stick and/or acceleration/deceleration paddle switch is released.

When the pilot releases the joy stick during ground operations steering programming directions to the autopilot are suspended and likewise acceleration/deceleration functions are suspended when the accelerate/decelerate switch is released to null at which point the autopilot is programmed to idle the aircraft's engines and feather the forward and aft propellers.

For take offs the aircraft is positioned by ground steering as for either a vertical take off or a horizontal take off. If the pilot wishes to take off horizontally the pilot actuates the auto land/auto take off flight function switch being one of the bank of seven switches of FIG. 2 (77) at which point the SFD in sensing the actuation of the auto land/auto take off switch and in also sensing the WOW switch (66) of FIG. 2, the SFD software discerns by means of WOW switch FIG. 2 (66) and it's associated logic signal FIG. 2 (68) that the aircraft is on the ground and the SFD software will program the autopilot to initiate a take off sequence as opposed to any other autopilot programming commands other than ground steering commands.

At this point in the conventional horizontal take off sequence the SFD software causes a delay to occur during which time the SFD programs the autopilot to accelerate the engine/engines RPM allowing time for an engine run up in preparation to initiating a SFD directed horizontal take off sequence. If, within the this time delay after the auto take off/auto land switch is activated and within this delay time the hover switch FIG. 2 (77) is sensed by the SFD's software as being actuated by the pilot, then the aircraft's autopilot will be programed for a vertical take off instead of a horizontal take off direction/function reprogramming commands and the aircraft will take off vertically under the autopilot's control at a safe preprogrammed incremental rate of vertical ascent without further pilot action.

When the WOW switch (66) of FIG. (2) is sensed by the SFD by means of logic signal (68) of FIG. 2 during the vertical take off sequence indicating that the aircraft is airborne and clear of the ground the pilot is allowed by the SFD software to initiate in-flight directional steering and functions for auto flight hover, in-flight operations, (as will be defined later herein), at which point the aircraft may be steered and accelerated or decelerated from any airspeed ranging from stationary hover to just above horizontal stall speed. In this flight mode the SFD will automatically suspend flight direction/function codes for auto flight hover functions and authorize horizontal flight mode direction/function codes when the autopilot's flight speed status of the aircraft is sensed by the SFD that the aircraft's airspeed attained is an airspeed level above horizontal stall speed.

If however, the pilot wishes to take off horizontally the pilot simply does not actuate the hover switch within the delay period after the pilots actuation of the auto land/auto take off switch. After the delay time has elapsed without the hover switch being activated by the pilot the SFD will direct the autopilot to accelerate the aircraft to horizontal take off speed while allowing the pilot to steer the aircraft via the autopilot as for ground operations as long as the SFD senses by way of the WOW switch (66) of FIG. 2 as indicated by the logic signal of FIG. 2 (68) that the aircraft is still on the ground until such time the WOW switch 66 of FIG. 2 indicates by means of logic signal (68) of FIG. 2 that the aircraft is airborne.

At this point the WOW switch (66) of FIG. 2 deactivates when the aircraft becomes airborne and upon the SFD sensing this aircraft status by means of logic signal (68) of FIG. 2, then the SFD subsequently provides in-flight directional/function steering according to SFD allowed pilot direction/function programming of the aircraft's autopilot.

If, in the case of the example HOVTOL UAV of U.S. Pat. No. 5,890,441, a short horizontal take off is desired by the pilot the pilot may initiate the hover switch anytime after the aircraft has begun its horizontal take off run.

In this case the SFD will sense activation of the hover switch and will subsequently initiate a autopilot programming sequence to reprogram the autopilot to augment the horizontal take off sequence with vertical thrust by programming the autopilot to open the vertical lift vectoring vanes to augment horizontal thrust with vertical thrust until the aircraft is airborne as indicated by WOW switch (66) of FIG. 2 and upon sensing the logic signal of FIG. 2 (68) that the aircraft is airborne and the SFD receives autopilot feedback by way of FIG. 2, (76) that a safe horizontal airspeed is attained at which point the SFD will reprogram the autopilot in to suspend the vertical lift augmentation sequence and to resume flight direction/function for normal horizontal flight operations.

If the aircraft example of U.S. Pat. No. 5,890,441 is in the horizontal flight mode and the pilot initiates the hover switch the SFD in sensing activation of same will redirect the autopilot's program to slow the aircraft down to hover speed and a vertical flight mode direction/function programming sequence is provided to the autopilot. In this mode as the SFD senses by way of autopilot feed back status of FIG. 2, (76) that the aircraft is approaching horizontal stall speed then the SFD will provide flight direction/function programming to the autopilot for full vertical flight direction/function programming of the aircraft's autopilot to continue to slow the aircraft until a stationary hover of the aircraft is attained.

At this point during hover flight mode the SFD directs the autopilot to allow only vertical flight mode heading steering of the craft and/or altitude/speed changes while in the hover mode. Horizontal flight function programming of the autopilot is suspended by the SFD in this mode.

During the hover flight mode if the pilot places the joy stick anywhere between the eleven and one-o-clock quadrant position the SFD will program the autopilot to descend the aircraft at a preprogrammed sequential rate until a desired hover altitude is attained and the pilot releases the joy stick. Upon sensing the joy stick in the null position the SFD then programs the autopilot to maintain the hover altitude attained.

Likewise, a similar sequence of SFD programming to the autopilot are executed for ascending during hover flight by the pilot placing the joy stick anywhere between the five and seven-o-clock quadrant position. Likewise, placing the aircraft at a different heading during hover flight is accomplished by placing the joy stick in the appropriate clock quadrant position as for changing headings in the horizontal flight mode.

If, however, the pilot wishes to navigate the aircraft during the hover mode and the pilot does not wish to stay in the stationary hover mode the pilot may actuate the auto flight switch at which point the SFD in sensing the auto flight switch directs the autopilot's programming to maintain hover flight but also allow in flight steering and function as with horizontal flight mode except the aircraft's vertical thrust and hover speed is maintained by the SFD from anywhere between stationary hover (zero knots) to just above horizontal flight stall speed as determined by the pilot via the accelerate/decelerate switch.

When the aircraft is in the non-stationary hover auto flight mode the SFD allows the pilot to accelerate up to just above horizontal flight stall speed or decelerate the speed at which the aircraft hovers down to a stationary hover (zero knots) with directional steering allowed by the SFD as in the horizontal flight mode.

If the pilot wishes to resume normal horizontal flight and transition from auto flight hover mode the pilot actuates the hover switch a second time and the SFD will direct the programming of the autopilot to accelerate the aircraft's auto flight hover speed to above horizontal flight stall speed. At this point all hover flight modes are automatically suspended by the SFD at which point the SFD programs the autopilot to resume horizontal flight mode direction and functions.

For vertical landings from the horizontal flight mode the pilot directs the aircraft via the SFD and autopilot programming of same to an area desired for a vertical landing and immediately prior to the final approach, the pilot activates the hover switch and within a specified delay time the pilot activates the auto flight switch at which point the SFD in sensing same programs the autopilot to auto flight hover the aircraft to the exact position for a landing specified by the pilot via the SFD. When the aircraft is slowed to a stationary hover and is in position for the vertical landing specified by the pilot the pilot then activates the auto land switch at which point the SFD in sensing the auto land switch and the WOW switch of FIG. (2) (66) by means of logic signal (68) of FIG. 2, directs the autopilot programming to start a slow, vertical, and sequential descent for a vertical landing without further pilot action.

Upon landing in the vertical flight mode the WOW switch (66) of FIG. 2 becomes activated by the weight of the aircraft touching the ground and upon the SFD sensing same by means of logic signal (68) of FIG. 2, programs the autopilot for ground maneuvering functions.

The aircraft having landed may then be ground taxied to a desired location and upon actuation of the shutdown switch the aircraft's autopilot is directed by the SFD to shut off all power and turn off the engine or engines.

For horizontal landings the pilot directs, via the SFD, the programming of the autopilot, the position of the aircraft for a horizontal landing and after the base leg and alignment with the runway, on final approach, the pilot actuates the auto flight switch and the pilot subsequently also activates the auto land/take off switch at which point the SFD senses the WOW switch (66) of FIG. 2 by means of logic signal (68) of FIG. 2 and the SFD programs the autopilot to initiate a preprogrammed horizontal landing flight sequence.

The autopilot will subsequently slow the aircraft to landing speed and maintain a slow steady landing descent. The SFD in this mode will disallow flight functions to the autopilot that would cause a stall during the horizontal landing sequence or interfere with the horizontal landing sequence being executed by the autopilot.

Upon landing in the horizontal autoland mode when the WOW switch (66) of FIG. 2 is sensed by means of logic signal (68) of FIG. 2 then the SFD subsequently programs the autopilot to idle the engine or engines allow the pilot to ground steer and reverse thrust the aircraft. Once the aircraft is in position for parking the pilot may then actuate the auto shutdown switch and shutdown the aircraft's engine or engines.

When the aircraft is in the horizontal flight mode and the pilot wishes the aircraft to fly autonomously a preprogrammed mission and flight regime resident in the aircraft's digital flight control computer, the pilot may do so in the horizontal flight mode by actuation of the auto flight switch. If after a prespecified delay, and no other flight function is activated by the pilot during this time, the SFD will direct the autopilot to enter this preprogrammed flight mission program and the aircraft will assume autonomous flight according to the said program resident in the aircraft's flight control computer. The aircraft will then assume the preprogrammed headings, altitudes, flight modes, airspeeds, and way points, etc., according to the resident program of the industry standard digital flight control system's computer.

If for some reason the aircraft's radio frequency data link transceiver (55) of FIG. 1, is out of range of the ground control station's (GCS) (57) of FIG. 1, radio frequency data link transceiver (55) of FIG. 1, or is otherwise lost (i.e. lost link, (82) of FIG. 1 lost), which in the case of SFD operation in a unmanned aerial vehicle application; the autopilot, in not sensing any status link with the SFD for a predetermined amount of time as determined by the aircraft's flight control computer's resident software; will optionally enter into the autonomous auto flight mode or alternately initiate a return to base preprogrammed flight regime resident in the flight control computer's memory.

In the return to base mode the aircraft's autopilot (55) of FIG. 1, assumes a flight path back to the base where the GCS (57) of FIG. 1, is resident or another prespecified location designated by the end user until the radio frequency datalink (82) of FIG. 1, is reestablished between the SFD (58) and GCS (57) of FIG. 1, and the aircrafts' autopilot (54) of FIG. 1, at this point the operator, via the SFD, may suspend the return to base flight mode and allow direction of the aircraft by the pilot. Or, the pilot may allow the aircraft to continue to return to base at the pilots' discretion by the pilots' activation of the return to base switch (77) of FIG. 2.

The aforesaid options, of a lost link scenario, must be decided upon prior to the flight mission and the appropriate option program selected and preprogrammed into the aircraft's flight control computer's memory prior to a flight mission.

Notwithstanding, a lost link scenario, the pilot may initiate, at any time during autonomous or semiautonomous flight modes, a return to base direction function code to the autopilot; providing however, that the aircraft is within radio frequency data link (82) of FIG. 1, is within operational range of the GCS (57) FIG. 1; via the SFD (58) of FIG. 1, by the actuation of the return to base switch (77) of FIG. 2, on the SFD's console (61) of FIG. 2, which shall cause the SFD to program the autopilot to initiate the aircraft's flight control computer's preprogrammed return to base, (i.e. location of the GCS or other prespecified location as determined by the end user), program.

If for some reason the SFD receives a flight status back from the aircraft's autopilot that the aircraft has encountered a negative flight maneuver or some other in-flight incident or status not conducive to safe operation; either the pilot or optionally a preprogrammed SFD action may automatically initiate an emergency shut down procedure; in the case of a low Reynolds class UAV applications; to accomplish such tasks as shutting off all engines, terminating all flight functions, deploying an emergency recovery parachute and activating any locating beacons such as; visual light beacons, audio sound beacons, and/or a radio frequency locator beacon, to aid ground crews in locating and recovering the aircraft after the mishap.

As stated earlier in this application it is not the intent of the inventor to limit the public domain's opportunities of various electronic/electrical/mechanical design possibilities in effectuating the application of the Semiautonomous Flight Director device as cited herein and as such additional function switches may be added to the SFD as desired by the user to effectuate additional preprogrammed aircraft flight function/direction or aircraft mission tasks such as releasing on board stores at predetermined times, or scenarios to conduct other on board aircraft functions as may be desired by the user.

Likewise the semiautonomous flight director device may also function in applications independent of the example HOVTOL uav application of U.S. Pat. No. 5,890,441 identified herein when the SFD device is appropriately interfaced to any compatible, commercially available, autopilot having a digital control system and the combination thereof thus affording a safer operation of an aircraft, airplane, glider, VTOL aircraft, automobile, or boat etc.; by an unskilled operator thereof.

I claim:

1. A method for controlling a vehicle having an automatic control system wherein the method programs a vehicle's automatic control system while disallowing the user to input unsafe vehicle maneuvers and functions wherein the method comprises the steps of:

1. Providing a user control interface,
2. Generating an interrupt signal,
   a. wherein said interrupt signal indicates control interface activity by a user,
3. Generating a status signal,
   a. wherein the status signal is representative of a vehicle's current operational condition,
4. Generating a plurality of control signals,
   a. wherein the control signals are representative of a user's desired maneuver,
5. Combining all the signals,
   a. The signal combing means comprising,
      i. A means to recognize the interrupt signal,
      ii. A means to recognize the status signal,
      iii. A means to recognize the control signals,
      iv. A means to combine the interrupt signal, the status signal, and control signals,
6. Interpreting the combined signal, the interpreting of said combined signal comprises the steps of:
   a. Generating a digital word,
      i. said digital word is generated from the combination of the interrupt signal, the status signal and the control signals,
   b. Inputting the digital word into a Function Direction Interpreter,
   c. Generating a memory address pointer,
      i. Said memory address pointer is generated from the Function Direction Interpreter,
7. Re-programming the running software of the vehicle's automatic control system, the reprogramming means comprises the steps of:
   a. Inputting the memory address pointer into a automatic programmer,
   b. Interpreting the memory address pointer,
   c. Selecting a software routine which corresponds to the memory address pointer,
      i. Said software routine comprises computer code, algorithms and program routines,
   d. Comparing said software routine to a vehicle's control laws,
   e. Verifying that said selected software routine is a maneuver which will not compromise the safe application of the vehicle or its cargo,
   f. Verifying that the selected software routine is representative of the users desired maneuver,
   g. Reprogramming the vehicle's automatic control system in response to said selected software routine,
   h. Verifying that the vehicle performed the user's specified maneuver.

* * * * *